March 1, 1960
J. DIAZ
2,927,201
SALES-PROMOTING APPARATUS
Filed Sept. 12, 1955
2 Sheets-Sheet 1
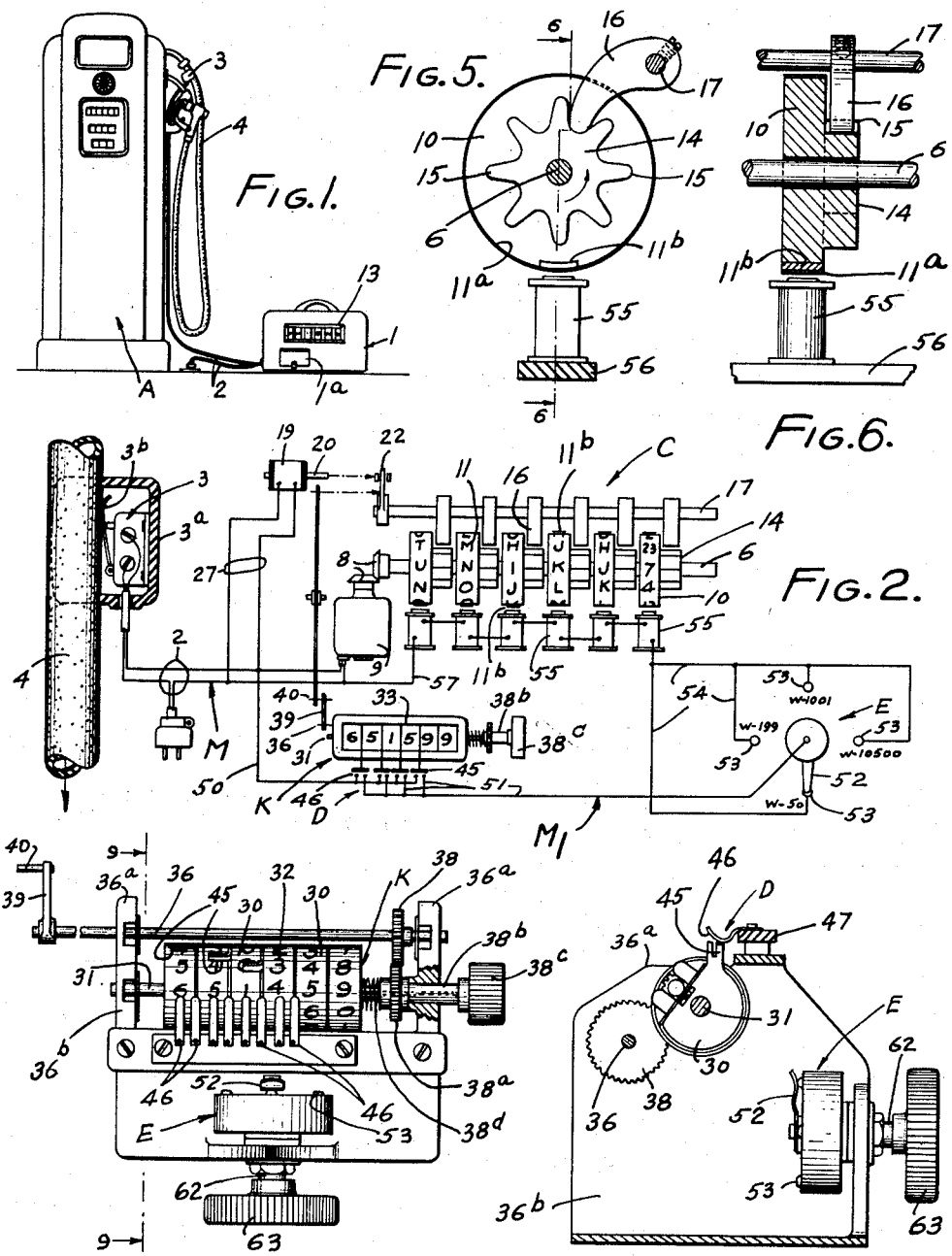
INVENTOR.
JAVIEL DIAZ
BY
ATTORNEY March 1, 1960
J. DIAZ
2,927,201
SALES-PROMOTING APPARATUS
Filed Sept. 12, 1955
2 Sheets-Sheet 2
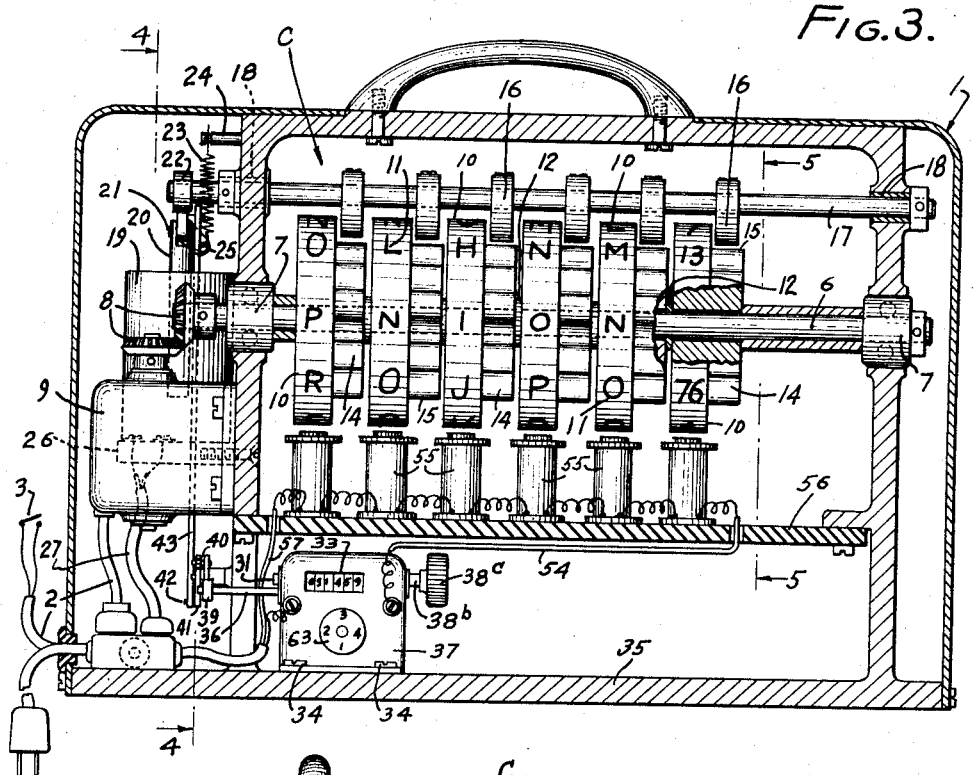
FIG. 3.
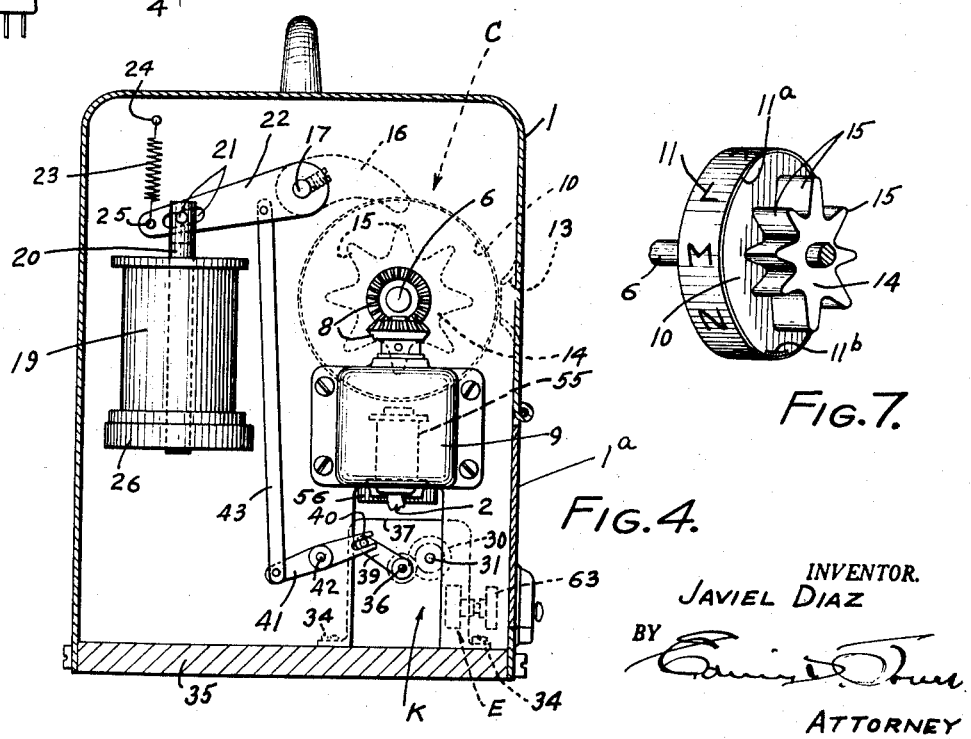
FIG. 4.
FIG. 7.
INVENTOR.
JAVIEL DIAZ
BY
ATTORNEY

United States Patent Office 2,927,201
Patented Mar. 1, 1960

2,927,201

SALES-PROMOTING APPARATUS

Javiel Diaz, Los Angeles, Calif., assignor of one-half to Aubrey I. Copelan, Inglewood, Calif., and one-third to Gabriel Corral, Los Angeles, Calif.

Application September 12, 1955, Serial No. 533,694

8 Claims. (Cl. 235—7)

This invention relates to apparatus for attracting patronage and promoting sales at automobile service stations, stores, markets and the like.

It is a purpose of this invention to provide an apparatus of this character which will automatically record each sale and effect a novel display visible to purchasers, as for example, one responsive to each dispensing operation of a gasoline dispensing pump or one responsive to each operation of a cash register, whereby when a predetermined number of sales has been made, the display will have definite advertising significance and indicate that the particular purchaser will be awarded a prize.

It is another purpose of this invention to provide apparatus such as described which readily may be installed for operation in connection with a gasoline dispensing pump, a cash register, or any other similar mechanism which is actuated when a purchase is made.

It is a further purpose of this invention to provide apparatus of the character described which may be set by the service station attendant or clerk at a store or the like, as the case may be, to indicate the award of prizes only when predetermined number of sales have been made.

Further, it is a purpose to provide apparatus in which a plurality of revoluble letter-bearing wheels which are caused to spin in response to each operation of a gasoline-dispensing pump or cash register, and wherein the wheels are automatically stopped to display the letters thereon in a row, upon the completion of each dispensing operation or recording operation of a cash register. According to the setting of the apparatus, the wheels will not spell out a particular word or words for example, the name of a product sold at the station or store, or to be advertised, until a predetermined number of dispensing operations or sales have taken place. The spelling out of a particular or selected word or message indicates that a prize is to be awarded to the purchaser making the predetermined sale which, for example, may be the fiftieth, the one hundredth or other predetermined number of sales.

I will describe only one form of sales-promoting apparatus embodying my invention, and will then point out the novel features thereof in claims.

In the accompanying drawings:

Fig. 1 is an elevational view of one form of apparatus embodying the present invention as arranged for operation in connection with a gasoline-dispensing pump at an automobile service station;

Fig. 2 is a diagrammatic view of the apparatus shown in Fig. 1;

Fig. 3 is a vertical sectional view, partly in elevation, of a unit of the apparatus which has the dual function of indicating the award of a prize and of displaying an advertisement of a product sold at the service station;

Fig. 4 is a vertical sectional view taken on the line 4—4 of Fig. 3;

Fig. 5 is a sectional view taken on the line 5—5 of Fig. 3;

Fig. 6 is a sectional view taken on the line 6—6 of Fig. 5;

Fig. 7 is a perspective view of one of the revolving display wheels of the unit shown in Fig. 3;

Fig. 8 is a top plan view on an enlarged scale of counter and control mechanism forming a part of the unit shown in Figs. 2 and 3; and Fig. 9 is a sectional view taken on the line 9—9 of Fig. 8.

As shown in Fig. 1, the apparatus embodying my invention is installed for operation in connection with a gasoline-dispensing pump A, for example, at an automobile service station. The main parts of the apparatus are enclosed in a housing or cabinet 1, mounted in any suitable manner so as to be visible to customers obtaining service at the pump.

Electrical energy for actuating the apparatus is supplied by a main circuit M having conductors 2 which may be plugged into any convenient electrical outlet not shown. Operation of the entire apparatus is effected by a master control switch 3 connected in series with the conductors 2. As here shown the master control switch 3 is mounted on the dispensing hose 4 of the pump A. This switch operates in response to flow of gasoline through the hose 4, to close a circuit for operating the apparatus in the housing 1.

Upon cessation of gasoline flow through the hose 4, the switch 3 opens disrupting the circuit and stopping operation of the apparatus. Any switch means capable of this operation may be used. In the present instance, the switch 3 is mounted in a housing 3a which is held in any suitable manner upon the hose 4 so that the operating lever 3b of the switch rests against the hose. The lever 3b is moved to close the switch when the hose expands under flow of gasoline, and to open the switch when flow ceases.

The apparatus in the housing 1 includes a combined advertising display and prize award determining unit C. More specifically the unit C includes a shaft 6 mounted in bearings 7 and driven through gearing 8 by an electric motor 9 connected in the main circuit M in series with the control switch 3. The shaft 6 supports in side-by-side relation a plurality of wheels 10 of disk form which are loose on the shaft but have sufficient frictional contact therewith to rotate and spin under rotation of the shaft. Each wheel has a felly 11 of non-magnetic material provided with a plurality of letters 11 of the alphabet. Additionally, each wheel has a segmental plate 11b of magnetizable material in the felly, the purpose of which will be described hereinafter.

Washers 12 are mounted on the shaft 6 between the wheels 10 to space them from one another. The wheel fellies 11a are visible from the exterior of the housing 1 through a window or opening 13 in the housing. When the wheels 10 come to rest a horizontal row of letters 11 are displayed through the opening 13 which may or may not spell a word or words. The manner in which the wheels are caused to spell out a word or words will be hereinafter fully described.

As a means for stopping spinning or rotation of the wheels 10 when the motor 9 is deenergized each wheel has fixed to one side thereof a stop member 14 formed with radial teeth 15 which are well spaced from each other as well as rounded on their outer ends. Stop pawls 16 are carried by a rock shaft 17 mounted in bearings 18 in the housing 1 so that upon appropriate turning of the shaft 17, the pawls will move into and out of position between teeth 15 to stop and release the wheels 10.

Turning of the rock shaft 17 to release the wheels 10 is effected by energization of a solenoid 19, the armature 20 of which has a pin-and-slot connection 21 with a crank arm 22 fixed on the shaft 16. A retractible spring 23 is connected at its ends as at 24 and 25 to housing 1 and crank arm 22, respectively, and operates to rock the shaft 17 so as to move the pawls 16 into engagement with the members 14. The spring 23 also returns the armature 20 to normal position when the solenoid 19 is de-energized. In this connection, it should be noted that the solenoid 19 is supported on a bracket 26 fixed in the housing 1 and, as shown in Fig. 2, is in a branch circuit M1 connected in parallel by means of conductors 27 with the main circuit M.

It will now be apparent that when a dispensing operation of the pump A takes place, the switch 3 closes the circuit for the motor 9 and solenoid 19. The solenoid 19 when energized retracts the armature 20 and through the crank arm 22 rocks the shaft 17 thereby moving the pawls 16 out of engagement with the member 14 and freeing the wheels 10. Simultaneously with freeing of the wheels, the motor 9 drives the shaft 6 to spin the wheels thereon.

When the dispensing operation of the pump A ceases, the switch 3 opens the circuits for the motor 9 and solenoid 19 whereupon, the spring 23 operates through the crank arm 22 and shaft 17 to move the pawls 16 into engagement with the members 14 thereby arresting spinning movement of the wheels 10. It is important to note that the construction of the members and pawls is such that as the pawls move between the teeth 15 they cam the wheels 10 to circumferential positions on the shaft such that any one letter 11 thereon will appear in full view in the housing window.

As will now be described, the apparatus is pre-set so that letters 11 on the wheels 10, when the latter come to rest, will not spell out a word or words until a predetermined number of operations of the pump A has taken place. Thus, until this predetermined number of operations has been effected, the letters visible through the window opening 13 are a jumble having no message significance. However, if desired the wheels 10 could be pre-set and lettered so that with each operation thereof, other than the predetermined operation which takes place when a given number of dispensing operations have taken place, the letters would spell out some word as an advertisement, but not the prize-determining word or message.

The means for causing the wheels 10 to come to rest in a manner presenting to view through the window 13 the prize-determining message or word, comprises in general, a counter mechanism C mounted in the housing 1. This counter mechanism may be one of the conventional counters now in general use, with which is combined circuit closing mechanism D and a selector switch unit E.

The counter K includes the usual rotative counter wheels 30 on a shaft 31. These wheels have numerals 32 on the peripheries thereof, visible in the usual manner through a window 33 of a housing 37 therefor, the counter being secured by fastenings 34 to the base 35 of the housing. A drive shaft 36 journalled in a pair of arms 36a of a frame 36b drives the shaft 31 so as to turn the counter wheels 30 through a gear 38 fixed on the shaft 36 meshing with a gear 38a fixed on a tubular shaft 38b splined on the shaft 31. By means of a spring 38d the shaft 38b is urged to a position in which the gears 38 and 38a are in mesh so that operation of the shaft 36 actuates the counter wheels 30. By forcing the shaft 38b inwardly against the tension of the spring 38d the gear 38a is moved out of mesh with the gear 38 permitting the counter K to be reset as desired.

The shaft 36 is oscillated by a crank arm 39 having a pin-and-slot connection 40 with a lever 41 fulcrumed in the housing 37, as at 42, and connected with the crank arm 22 by means of a link 43. Thus with each operation of the pump A and consequent energization of the solenoid 19, the crank arm 22, through the link 43, lever 41, crank arm 39, drive shaft 36 and gears 38, will turn the shaft 31 so that the counter wheels 30 will function in the customary manner to record the number of operations of the pump.

The circuit-closing mechanism D associated with the counter K, includes contact elements 45 on selected wheels 30 arranged to turn therewith to engage pairs of stationary contacts 46 mounted on a bar 47 of insulating material fastened to the frame 36b. One stationary contact 46 of each pair is connected by wires 50 with one of the conductors 2. The other stationary contact 46 of each pair is connected by wires 51 to a rotary contact arm 52 of the selector switch E.

From the foregoing it will be manifest that the wires 50, 51, 54, 57 constitute a branch circuit generally indicated at M1 which is connected in parallel with the main circuit M, and in which is included the magnets 55, the selector switch E, and the contacts 45 and 46.

The selector switch E includes four stationary contacts 53 in a circular arrangement about the axis of the arm 52 so that any one of which may be engaged by rotary adjustment of the arm. Each stationary contact 53 is by wires 54 connected in series with a plurality of electromagnets 55 one for each of the wheels 10, and all mounted directly therebeneath on a support 56 fixed in the housing 1.

These magnets 55 are connected in series with each other and a conductor 57, the latter in turn being connected to one of the conductors 2. The magnets 55 are all energized when any one movable contact 45 on the counter wheels 30 engages a pair of its respective stationary contacts 46, provided the contact arm 52 of the selector switch E is engaged with any one of the contacts 53. When the magnets 55 are energized they attract the magnetizable segment 11b on the wheels 10 thereby so arresting rotation of the wheeels that they are stopped in a position so that the letters 11 thereon as visible through the window 13, will spell out the predetermined word or message indicating that a prize is to be awarded to the purchaser.

The selector switch E is supported on a vertical wall of the frame 36b, and the movable contact arm 52 is fixed on a shaft 62 which extends out through the housing 37, and has a knob 63 thereon for operation.

It will now be apparent that the counter K may be set or adjusted by means of the control knob 38c on the shaft 31, and that the counter wheels 30 are successively operated depending upon the number of operations of the pump A. The manner in which this conventional counter operates is well known and need not here be described. However, it should be noted that each wheel 30 of the counter must turn a given extent to bring the movable contact element 45 thereon into circuit-closing engagement with the related pair of stationary contacts 46.

As here arranged the second counter wheel 30 from the right end of the row of wheels as seen in Fig. 2, is provided with a contact element 45 adapted to engage the right-hand pair of stationary contacts 46. Assume now that this second from the right wheel 30 and the right-hand wheel 30 will register from 0 to 99 and that the contact arm 52 of the selector switch E is in engagement with the stationary contact designated "W50" as shown in Fig. 2.

With the apparatus thus set, starting the counter K at zero, when the fiftieth (50th) sale is made, the motor 9 is operated to spin the wheels 10 and the counter is operated at the same time to indicate the fiftieth sale. At this time contact 45 on the second from right wheel 30 engages the right-hand pair of contacts 46 thereby closing the circuit for the magnets 55. These magnets will then attract the segments 11b on the peripheries of the wheels 10 and arrest the spinning of the wheels so as to align the letters 11 thereon to spell out the predetermined word or message indicating that a prize is to be awarded the fiftieth purchaser.

The other wheels 30 to the left of the second wheel from the right end, will record operations of the pump in terms of 100, 1000 and so on, in the same manner as above noted, provided the selector switch E is set on one of the contacts 53 which may for example be designated "W199," "W1001" and "W10,500." The prize-indicating message will be formed by the wheels 10 depending in all cases on the setting of the contact arm 52 in respect to contacts 53.

Concurrently with completion of any one dispensing operation of the pump A the switch 3 is automatically opened resulting in the stop pawls 16 being moved into position to hold the wheels 10 against turning and thereby assuring that the letter display or the prize-awarding message will be maintained until the next dispensing operation of the pump takes place.

The attendant at the service station may set the counter C and selector switch E as desired, and the public is not informed as to the number of sales required to bring about a prize-winning operation of the apparatus since the switch is concealed in the housing 1. Access to the switch E is made possible by a door 1a in the housing that can be provided with a lock as illustrated in Fig. 4.

It will now be apparent that the apparatus will serve to attract trade and promote the sale of commodities sold at the establishment where the apparatus is installed.

While the apparatus is here shown and described as operating in conjunction with a gasoline-dispensing pump, it is obvious that the switch 2, could be installed to operate responsive to movement of some part of a cash register or similar sales-recording means, whereby the apparatus will operate in the same manner as herein set forth.

Although I have herein shown and described only one form of sales-promoting apparatus embodying my invention, it is to be understood that various changes and modifications may be made therein without departing from the spirit of the invention and the spirit and scope of the appended claims.

What I claim is:

1. Sales-promoting apparatus, including display mechanism including a shaft, and a plurality of wheels mounted on said shaft so as to be driven thereby and to rotate relative thereto, each of the wheels having characters on the periphery thereof; an electric motor for driving said shaft; counter mechanism for recording the number of sales of a commodity; a main electrical circuit for said motor including a source of current; a control switch for said circuit constructed and arranged to be closed concurrently with the sale of each commodity; means in said circuit for operating said counter mechanism responsive to closing of said switch; electromagnetic means operable to arrest rotation of said wheels so as to cause said wheels to form an intelligible message; a branch circuit connected to said main circuit and including said electromagnetic means; and circuit-closing means for the branch circuit operable by said counter mechanism to close the branch circuit and energize said electromagnetic means only when a predetermined number of sales has been recorded by said counter mechanism.

2. Sales-promoting apparatus, including display mechanism including a shaft, and a plurality of wheels mounted on said shaft so as to be driven thereby and to rotate relative thereto, each of the wheels having characters on the periphery thereof; an electric motor for driving said shaft; counter mechanism for recording the number of sales of a commodity; a main electrical circuit for said motor including a source of current; a control switch for said circuit constructed and arranged to be closed concurrently with the sale of each commodity; means in said circuit for operating said counter mechanism responsive to closing of said switch; electromagnetic means operable to arrest rotation of said wheels so as to cause said wheels to form an intelligible message; a branch circuit connected to said main circuit and including said electromagnetic means; circuit-closing means for the branch circuit operable by said counter mechanism to close the branch circuit and energize said electromagnetic means only when a predetermined number of sales has been recorded by said counter mechanism; and means by which the circuit-closing means is rendered adjustable to vary the predetermined number of sales required to be recorded by the counter mechanism to close the branch circuit.

3. Sales-promoting apparatus, including display mechanism including a shaft, and a plurality of wheels mounted on said shaft so as to be driven thereby and to rotate relative thereto, each of the wheels having letters of the alphabet on the periphery thereof; an electric motor for driving said shaft; counter mechanism including a plurality of wheels for recording the number of sales of a commodity; a main electrical circuit for said motor including a source of current; a control switch for said circuit constructed and arranged to be closed concurrently with the sale of each commodity; means in said circuit for operating said counter mechanism responsive to closing of said switch; electromagnetic means operable to arrest rotation of said wheels so as to cause said letters to spell out a message; a branch circuit connected to said main circuit and including said electromagnetic means; circuit closers operatively connected to certain of said counter wheels for successive closure thereby according to predetermined numbers of sales as recorded by the counter mechanism; and a selector switch manually adjustable to select any number of the circuit closers into the branch circuit, whereby said electro-responsive means is energized to stop rotation of the lettered wheels upon the counter mechanism recording any predetermined number of sales.

4. Sales-promoting apparatus for operation at an automobile service station in association with a gasoline-dispensing pump, including: display mechanism including a rotary shaft; a plurality of display wheels mounted on said shaft so as to be driven thereby and rotated relative thereto; each of said wheels having display characters thereon capable of spelling out a message when said wheels come to rest with certain of said characters aligned; an electric motor for driving said shaft; a main electrical circuit for said motor including a control switch; means mounting said switch on the dispensing hose of said pump so that said switch will close said circuit responsive to flow of gasoline through said hose and will open said circuit upon cessation of said flow; a counter for recording each operation of said pump; a branch circuit connected in parallel to the main circuit; electrically operable means in said branch circuit for actuating said counter; means operable by said electrically operable means for stopping rotation of said wheels; electromagnetic means operatively connected with said wheels for stopping the latter in positions such that said display characters will form a message; and circuit-closing means for the branch circuit operable by said counter only when the latter records a predetermined number of pump operations.

5. Sales-promoting apparatus for operation at an automobile service station in association with a gasoline-dispensing pump including: display mechanism including a rotary shaft; a plurality of display wheels mounted on said shaft so as to be driven thereby and rotated relative thereto; each of siad wheels having display characters thereon capable of spelling out a message when said wheels come to rest with certain of said characters aligned; an electric motor for driving said shaft; a main electrical circuit for said motor including a control switch; means mounting said switch on the dispensing hose of said pump so that said switch will close said circuit responsive to flow of gasoline through said hose and will open said circuit upon cessation of said flow; a counter for recording each operation of said pump; a branch circuit connected in parallel to the main circuit; electrically operable means in said branch circuit for actuating said counter means operable by said electrically operable means for stopping rotation of said wheels; electromagnetic means operatively connected with said wheels for stopping the latter in positions such that said display characters will form a message; circuit-closing means for the branch circuit operable by said counter only when the latter records a predetermined number of pump operations; and a selector switch in the branch circuit operable to control the operation of said circuit-closing means whereby the branch circuit will be closed only when a predetermined number of operations of said counter takes place.

6. Sales-promoting apparatus comprising: display mechanism including a shaft and a plurality of rotary disks mounted on said shaft so as to be driven thereby and to rotate relative thereto, each of said disks having letters of the alphabet on the periphery thereof; an electric motor for driving said shaft, counter mechanism for recording the number of sales made at an automobile service station, store or the like; a main electrical circuit for said motor including a control switch arranged to be operated by the clerk or attendant at said station or store when each sale is made; electromagnetic means in said circuit for operating said counter mechanism before the closing of said switch; spring-actuated means for stopping rotation of said disks upon the opening of said circuit; a second electromagnetic means for stopping rotation of said disks in a manner causing said letters to spell out a word; a second circuit for said second electromagnetic means, energized from said main circuit; and circuit-closing means in said second circuit, operable responsive to a predetermined operation of said counter to close said second circuit.

7. A sales-promoting apparatus, including means for displaying characters in an indeterminate arrangement or a predetermined arrangement to form an intelligible message, said means comprising a plurality of wheels mounted on a shaft so as to be driven thereby or individually rotate relative thereto, the characters being on the peripheries of said wheels, and means for driving said shaft; means for arresting rotation of said wheels on said shaft, comprising ratchet wheels, one for each of said wheels fixed thereto, a second shaft, pawls fixed to said second shaft, one for each of said ratchet wheels, means for urging the second shaft to a position in which the pawls are out of engagement with the ratchet wheels, and electromagnetic means for rotating said shaft against the action of said urging means to move the pawls out of engagement with the ratchet wheels.

8. A sales-promoting apparatus as embodied in claim 7, wherein means is provided for arresting rotation of said wheels by said shaft so that when they come to rest the characters on said wheels are in a predetermined arrangement to form an intelligible message, said wheel-arresting means comprising electromagnets, one for each of the wheels, and armatures, one for each of the wheels fixed thereto.

References Cited in the file of this patent

UNITED STATES PATENTS

| | | |
|---|---|---|
| 687,811 | Allison | Dec. 3, 1901 |
| 713,159 | Schinneller | Nov. 11, 1902 |
| 895,880 | Morris | Aug. 11, 1908 |
| 1,058,545 | Caldwell | Apr. 8, 1913 |
| 2,090,225 | O'Brien | Aug. 17, 1937 |